(12) United States Patent
Phan Le et al.

(10) Patent No.: US 10,909,819 B2
(45) Date of Patent: Feb. 2, 2021

(54) HAPTIC ACTUATOR CONTROLLER

(71) Applicant: GOODIX TECHNOLOGY (HK) COMPANY LIMITED, Hong Kong (HK)

(72) Inventors: Kim Phan Le, Eindhoven (NL); Jozef Thomas Martinus van Beek, Rosmalen (NL)

(73) Assignee: GOODIX TECHNOLOGY (HK) COMPANY LIMITED, Hongkong (HK)

( * ) Notice: Subject to any disclaimer, the term of this patent is extended or adjusted under 35 U.S.C. 154(b) by 0 days.

(21) Appl. No.: 16/400,480

(22) Filed: May 1, 2019

(65) Prior Publication Data
US 2019/0340896 A1 Nov. 7, 2019

(30) Foreign Application Priority Data
May 2, 2018 (EP) .................................. 18170408

(51) Int. Cl.
*G08B 6/00* (2006.01)
*G06F 3/01* (2006.01)

(52) U.S. Cl.
CPC .............. *G08B 6/00* (2013.01); *G06F 3/016* (2013.01)

(58) Field of Classification Search
CPC ................................. G08B 6/00; G06F 3/016
USPC ........................................................ 340/407.1
See application file for complete search history.

(56) References Cited

U.S. PATENT DOCUMENTS

| | | | | |
|---|---|---|---|---|
| 7,639,232 B2 * | 12/2009 | Grant | ................... | B06B 1/0215 345/156 |
| 7,742,036 B2 * | 6/2010 | Grant | ................... | H04M 19/04 345/156 |
| 8,325,144 B1 * | 12/2012 | Tierling | ................. | G06F 3/016 345/156 |
| 8,462,125 B2 * | 6/2013 | Birnbaum | ............... | G06F 3/041 345/173 |
| 9,054,627 B2 | 6/2015 | Garg et al. | | |
| 9,063,571 B2 * | 6/2015 | Birnbaum | ............... | G06F 3/017 |
| 2010/0013653 A1 | 1/2010 | Birnbaum et al. | | |
| 2010/0153845 A1 | 6/2010 | Gregorio et al. | | |
| 2011/0261652 A1 | 10/2011 | Horsky et al. | | |
| 2012/0194463 A1 | 8/2012 | Tierling et al. | | |
| 2014/0085064 A1 | 3/2014 | Crawley et al. | | |
| 2015/0332565 A1 * | 11/2015 | Cho | ........................ | G08B 6/00 310/317 |
| 2016/0241119 A1 | 8/2016 | Keeler | | |

(Continued)

FOREIGN PATENT DOCUMENTS

| | | | | |
|---|---|---|---|---|
| CN | 107894277 A | | 4/2018 | |
| EP | 2484104 B1 * | | 9/2016 | ............ H04M 19/04 |

(Continued)

*Primary Examiner* — John A Tweel, Jr.

(57) ABSTRACT

A controller for a haptic actuator is described. The controller includes a driver which has an output configured to be coupled to a linear resonant actuator in a first mode and a frequency detector having an input configured to be coupled to the haptic actuator in a second mode. The frequency detector is configured to detect a signal generated on the terminals of the haptic actuator in response to an externally applied force and to determine a resonant frequency of the haptic actuator from the generated signal.

14 Claims, 6 Drawing Sheets

(56) References Cited

U.S. PATENT DOCUMENTS

2018/0321748 A1* 11/2018 Rao .................... G06F 3/016
2019/0039092 A1*  2/2019 Kim .................... G06F 3/01

FOREIGN PATENT DOCUMENTS

EP         3157266 A1     4/2017
EP         3157266 B1  *  2/2019   ............ H04R 3/005

* cited by examiner

100

120

130

HAPTIC ACTUATOR CONTROLLER

CROSS-REFERENCE TO RELATED APPLICATIONS

This application claims the priority under 35 U.S.C. § 119 of European patent application no. 18170408.1, filed May 2, 2018 the contents of which are incorporated by reference herein.

FIELD

This disclosure relates to controllers for haptic actuators.

BACKGROUND

Haptic actuators such as linear resonant actuators (LRA), piezo-actuators and Eccentric Rotating Mass Motors are typically used in mobile devices such as smart-phones to provide haptic feedback to a user. Haptic actuators such as piezo actuators and LRAs are typically driven by a signal having a major frequency component corresponding to the resonant frequency of the haptic actuator being driven. In one typical use case, the haptic actuator is used in silent mode at its resonant frequency to generate a vibration. In another typical use case, the haptic actuator may emulate a mechanical button click.

SUMMARY

Various aspects of the disclosure are defined in the accompanying claims. In a first aspect there is provided a controller for a haptic actuator, the controller comprising a driver having an output configured to be coupled to a haptic actuator in a first mode; and a frequency detector having an input configured to be coupled to the haptic actuator in a second mode; wherein in the second mode, the frequency detector is configured to detect a signal generated on the terminals of the haptic actuator in response to an externally applied force and to determine a resonant frequency of the haptic actuator from the generated signal.

In one or more embodiments, the frequency detector may comprise a threshold detector wherein the frequency detector is configured to determine the resonant frequency in response to the generated signal exceeding a predetermined threshold.

In one or more embodiments, the frequency detector may comprise a further input configured to be coupled to an accelerometer.

In one or more embodiments, the controller may be configured to switch to the second mode in response to an accelerometer signal being received on the further input.

In one or more embodiments, the controller may be configured to detect an accelerometer signal and to determine the resonant frequency from the generated signal in response to receiving the accelerometer signal.

In one or more embodiments, the controller may be further configured to detect a temperature signal and to determine the resonant frequency from the generated signal in response to detecting a change of temperature.

In one or more embodiments, the frequency detector may be configured to determine the resonant frequency by at least one of detecting the zero-crossings of the generated signal, cross-correlating the generated signal with sine waves of varying frequency, and by applying the Goertzal algorithm to the generated signal.

In one or more embodiments, the frequency detector may be configured to determine the resonant frequency by determining the frequency spectrum of the generated signal and determining the frequency with the highest amplitude.

In one or more embodiments, the frequency detector may be configured to determine the resonant frequency by interpolation of the determined frequency spectrum.

In one or more embodiments, the controller may comprise a mode controller and a switch module having a first switch terminal coupled to the driver output, a second switch terminal coupled to the frequency detector input, a third switch terminal configured to be coupled to a haptic actuator, and a control terminal coupled to the mode controller, wherein the mode controller is configured to control the switch module to couple the first switch terminal to the third switch terminal in the first mode and the second switch terminal to the third switch terminal in the second mode.

In one or more embodiments, the controller may comprise a series arrangement of an energy harvester module and an energy storage module coupled to the frequency detector, wherein the switch module further comprises a fourth switch terminal and the mode controller is configured to control the switch module to couple the third switch terminal to the fourth switch terminal in a third mode, wherein in the third mode the controller is configured to store the energy from the generated signal and wherein in the second mode the stored energy is supplied to the frequency detector.

In one or more embodiments, the controller may be further configured to alter the frequency of the drive signal provided by the driver in the first mode dependent on the resonant frequency determined in the second mode.

Embodiments of the controller may be included in a device including a haptic actuator. The controller may be coupled to the haptic actuator.

In a second aspect there is defined a method for controlling a haptic actuator comprising: in a first mode providing a drive signal for a haptic actuator and in a second mode detecting a signal generated on the terminals of the haptic actuator in response to an externally applied force and determining a resonant frequency of the haptic actuator from the generated signal.

In one or more embodiments, the method may further comprise determining the resonant frequency by determining the frequency spectrum of the generated signal and determining the frequency with the highest amplitude by interpolation of the determined frequency spectrum.

In a third aspect there is described a computer program product comprising instructions which, when being executed by a processing unit, cause said processing unit to perform the steps of in a first mode providing a drive signal for a haptic actuator and in a second mode detecting a signal generated on the terminals of the haptic actuator in response to an externally applied force and determining a resonant frequency of the haptic actuator from the generated signal.

In the figures and description like reference numerals refer to like features.

BRIEF DESCRIPTION OF DRAWINGS

Embodiments are now described in detail, by way of example only, illustrated by the accompanying drawings in which.

DESCRIPTION

Figure 1:
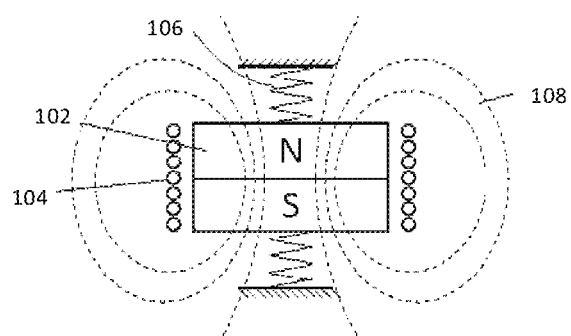
FIG. 1 shows a diagram of a typical LRA.

FIG. 1 shows a diagram of a typical LRA 100. The LRA 100 is a mechanical resonator typically consisting of a permanent magnet 102 acting as a proof mass. The magnet 102 is suspended by springs 106 and surrounded by a voice coil 104. When an AC current is sent through the voice coil 104, a magnetic field 108 created by the coil 104 will exert a force on the magnetic proof mass 102, making it vibrate back and forth. When included in a mobile device such as a phone, the resulting vibration results in a haptic sensation to a user holding the phone.

Figure 2:
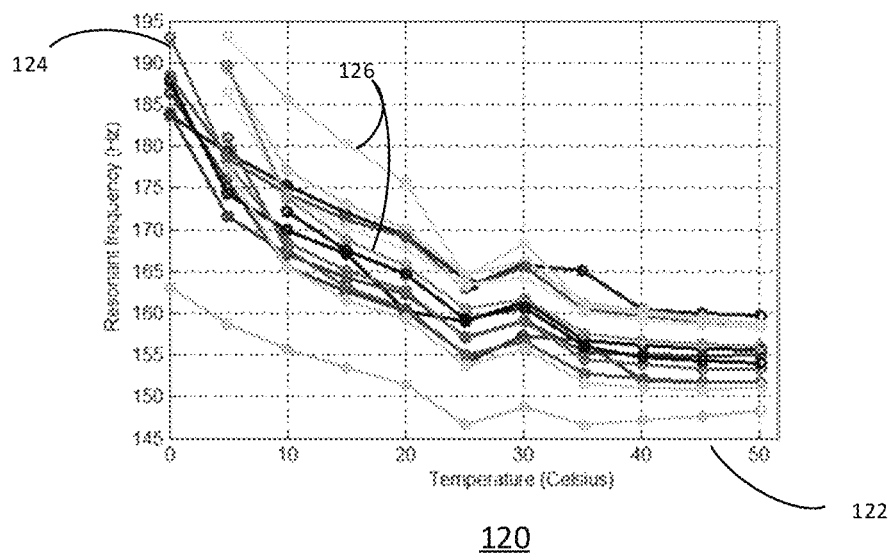
FIG. 2 illustrates the variation in resonant frequency of a LRA due to manufacturing tolerances and temperature.

FIG. 2 illustrates a graph 120 showing the variation in measured resonant frequency $f_0$ versus temperature due to spring stiffness changes with temperature for LRAs. The x-axis 122 shows temperature between 0 and 50 degrees Celsius. The y-axis 124 shows the variation in resonant frequency between 145 Hz and 195 Hz. Each of the lines 126 shows the variation in resonant frequency with temperature for different samples of a LRA. This variation is due to the manufacturing tolerances of the different LRA samples. For this particular example, $f_0$ decreases from a range between 164 Hz to 194 Hz at 0 degrees Celsius to a range between 147 Hz to 160 Hz at 50 degrees Celsius. The spread of $f_0$ at a fixed temperature varies considerably. In this example the average variation of resonant frequency is approximately 18%.

Figure 3:
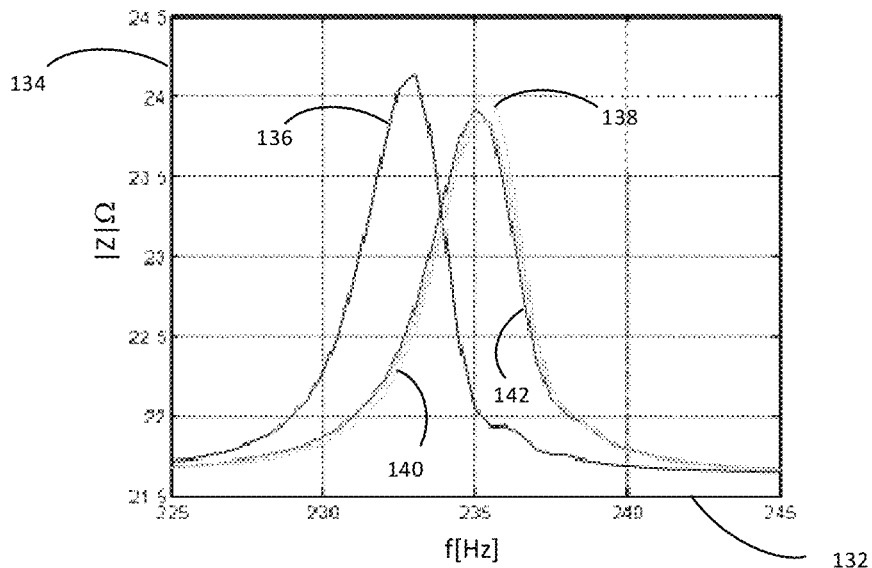
FIG. 3 shows the variation of resonant frequency dependent on position of a LRA when included in a mobile device.

FIG. 3 shows a graph 130 illustrating the position-dependent frequency response of a LRA included in an example mobile handset. The x-axis 132 shows the frequency between 225 Hz and 245 Hz. The y-axis 134 shows the magnitude of the impedance between 21.5 ohms and 24.5 ohms. Line 136 illustrates the response of the handset when placed on a table, having a resonant peak at approximately 233 Hz. Lines 138, 140 and 142 show the frequency response when the phone is held in different orientations showing a variation in resonant frequency between approximately 235 and 236 Hz. As can be seen, the resonant frequency $f_0$ of the LRA may vary by approximately 1% in this example dependent on whether or not a phone including the LRA is held, or placed on a table. The resonant frequency may also be dependent on the orientation of the phone when held.

In a mobile phone including an LRA, in order to effectively produce a notification vibration, the LRA should be driven by a sinewave at its resonant frequency ($f_0$). If the driving frequency deviates from $f_0$, the level of acceleration felt by the user is significantly reduced. Alternatively a higher current amplitude may be required by the voice coil to produce the same haptic effect leading to increased power consumption.

For emulating other haptic effects, such as a click button, the LRA should be driven by a suitable signal pattern, which ensures a correct acceleration profile felt by the user. The drive pattern should be correctly designed to avoid oscillation at the end of the pattern also referred to as ringing, due to the resonant vibration. Therefore, the exact drive pattern is dependent on the resonant frequency among other parameters of the LRA.

In each case, for optimal operation it is preferable to know an exact value of $f_0$ prior to sending a drive signal to the LRA. However, as illustrated in FIGS. 2 and 3, the actual resonant frequency can vary from device to device due to production spread. Even for the same device, the resonant frequency may still significantly change with temperature, aging, way of mounting, way of holding the phone.

Figure 4:
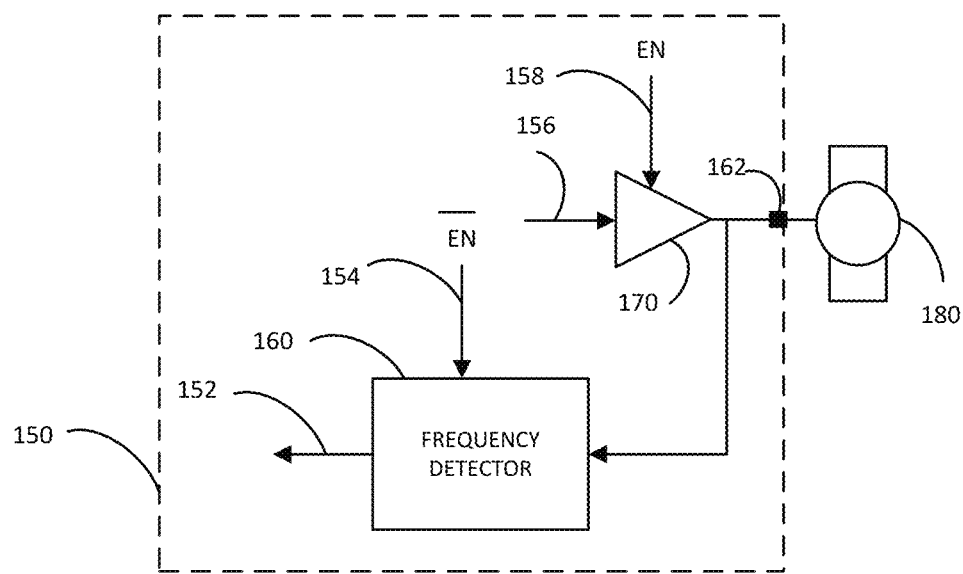
FIG. 4 illustrates a haptic actuator controller according to an embodiment.

FIG. 4 shows a haptic actuator controller 150 according to an embodiment. The haptic actuator controller 150 includes a frequency detector 160 and a haptic driver 170 which may for example be a class-D amplifier. The frequency detector 160 may have an input connected to a terminal 162 of the haptic actuator controller 150. The frequency detector 160 may have an output 152. The frequency detector may have a control input 154. The haptic driver 170 may have an input 156. The haptic driver 170 may have an output connected to the terminal 162 of the haptic actuator controller 150. The haptic driver 170 may have a control input 158.

In operation, the terminal 162 of the haptic actuator controller 150 may be connected to a LRA 180. In a first or drive mode of operation, the haptic driver 170 may be enabled by a control signal (EN) on the haptic driver control input 158. The frequency detector 160 may be disabled by the complement of the control signal ($\overline{EN}$) received on the frequency detector control input 154. The control signal and the complement of the control signal may be generated by a mode controller (not shown). In this first mode, the haptic driver 170 may receive a drive signal on the haptic driver input 156 and drive the LRA 180.

In a second or listening mode, the haptic driver 170 may be disabled by a control signal on the haptic driver control input 158. The frequency detector 160 may be enabled by the complement of the control signal received on the frequency detector control input 154. In this second mode, if an externally applied force causes the LRA 180 to vibrate, a resulting signal generated on the terminal 162 may be detected by the frequency detector 160. The frequency detector 160 may determine a fundamental frequency of the received signal. For example, the fundamental frequency may be determined by zero-crossing counting, applying a fast fourier transform (FFT) to determine the peak frequency, or applying a wavelet transform. In other examples, the fundamental frequency may be determined by cross-correlating the generated signal with sine waves of varying frequency. In other examples, the fundamental frequency may be determined by applying the Goertzal algorithm to the generated signal.

The proof mass of the LRA 180 may vibrate slightly at its natural or resonant frequency in response to an externally applied force. This force may be for example due to a user tapping a phone including the LRA or a force due to the movement of the phone as it is being carried. As for any electromagnetic motor, the LRA 180 may induce an electromotive force (emf) when the mass is vibrating. The electromagnetically induced emf is determined purely by the rate of change of the magnetic flux through the voice coil according to Faraday's law of induction. The change of magnetic flux in this case is made by the movement of the magnet which has a magnetic field B with respect to the voice coil.

$$\text{emf} = Bl\frac{dx}{dt} \quad (1)$$

in which, emf is the electromotive force in volts (V), Bl is the force factor (Tesla.m) which depends on the design of the LRA, x is the excursion of the mass (m) and t is time (s).

If the mass is vibrating at its resonant frequency $f_0$, the excursion x is given by:

$$x = a \sin(2\pi f_0 t) \quad (2)$$

where a is the amplitude of the vibration. Replacing (2) to (1) yields:

$$\text{emf} = 2\pi f_0 a Bl \cos(2\pi f_0 t) \quad (3)$$

It can be seen from equation (3) that the generated emf is also a sinusoidal signal with the same frequency $f_0$ and with the phase rotated by 90° compared to the vibration phase. The amplitude of the emf may depend on the design of the LRA, which affects the Bl factor and $f_0$, and on the vibration amplitude. The resonant frequency may typically be in a range between 100 Hz and 300 Hz By detecting and analysing the generated signal produced by the LRA 180 when not being driven, the haptic actuator controller 150 can determine the resonant frequency $f_0$. This way, the frequency detection is passive and so it is not necessary to electrically actuate the LRA 180 to measure its resonant frequency using a specific calibration signal. Passively detecting the resonant frequency may allow the determination of the resonant frequency at reduced power level. Furthermore, since typically most of the time the LRA 180 is not driven, the resonant frequency determination may be repeated more often by the frequency detector 160. This may result in a more accurate tracking of the resonant frequency. The resulting determined resonant frequency may be used to modify the drive signal when the haptic actuator controller 150 returns to the first mode of operation.

In other examples instead of controlling an LRA, the haptic actuator controller 150 may be connected to other haptic actuators such as piezo-electric actuators. Piezo-electric actuators are normally driven by an AC signal typically at the actuator resonant frequency in a first mode of operation. In the second mode of operation, the piezo-electric actuator may generate a signal from an oscillation of the piezo-electric actuator caused by an externally applied force. The generated signal may be detected by the haptic actuator controller 150 and used to determine the resonant frequency of the piezo-electric actuator. This determined resonant frequency may be used by the haptic actuator controller 150 to adapt the drive signal in the first mode of operation.

Figure 5:
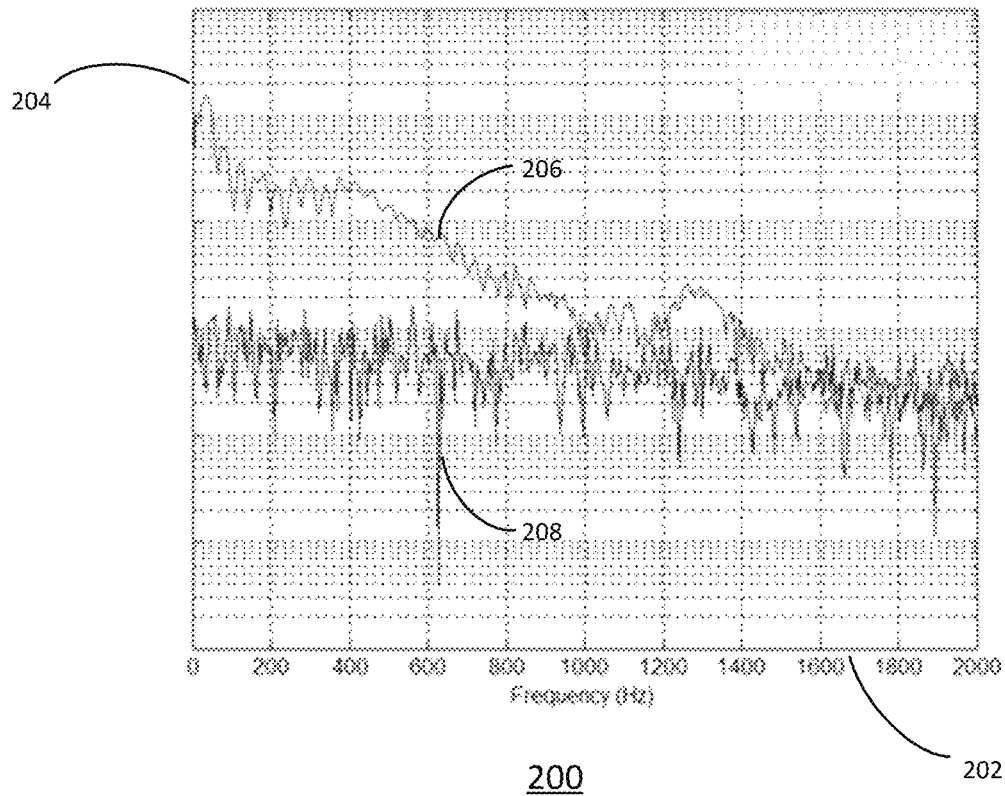
FIG. 5 illustrates a graph of displacement acceleration versus frequency for a LRA.

FIG. 5 shows a graph 200 of the measurement of vibration spectrum of an example mobile device containing a LRA. The x-axis 202 shows the frequency on a linear scale varying between 0 Hz and 2 kHz. The y-axis 204 shows the amplitude of acceleration of the LRA proof mass. The line 206 shows the vibration spectrum which occurs in response to the mobile phone being slightly tapped. When the phone has been tapped, the resulting vibration has a wide frequency spectrum for example ranging from frequencies of DC up to 1.5 kHz. For comparison, line 208 shows the frequency spectrum when the mobile device containing an LRA is static.

Figure 6A:
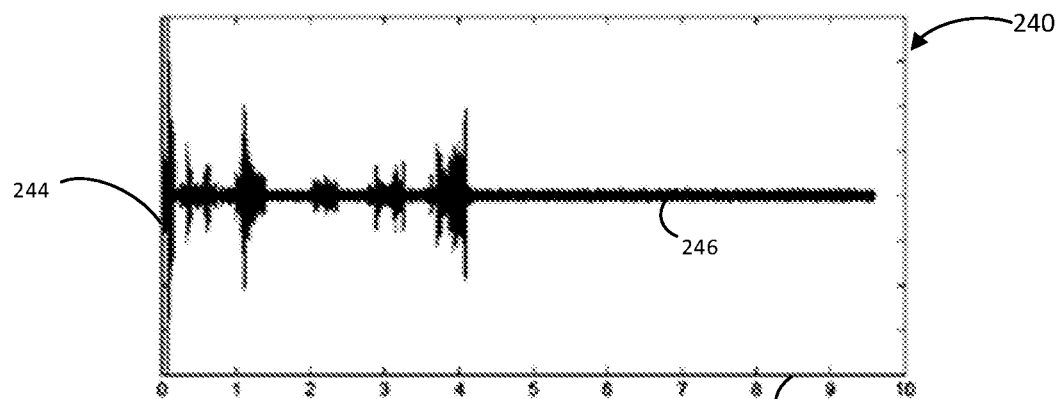
FIG. 6A illustrates an example signal generated by a LRA when a force is applied.
Figure 6B:
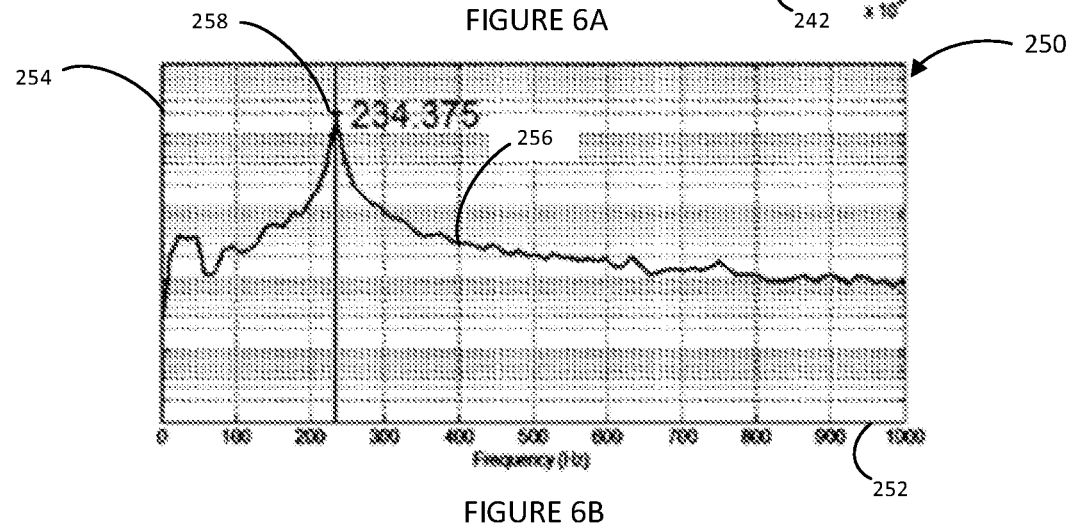
FIG. 6B shows a frequency spectrum determined from the example signal of FIG. 6A.

FIG. 6A illustrates a graph 240 of an example signal generated by a LRA which may be detected by the frequency detector 160. The x-axis 242 indicates time, the y-axis 244 shows the amplitude variation and the detected signal shown by line 246. The corresponding frequency spectrum of the signal 246 is illustrated by FIG. 6B which shows a graph 250 of the frequency on the x-axis 252 which ranges from 0 Hz to 1 kHz plotted on a linear scale versus the amplitude on the y-axis 254 plotted on a logarithmic scale. The frequency spectrum response is shown by graph line 256. The frequency with maximum amplitude 258 corresponding to the determined resonant frequency of the LRA has a value of 234.4 Hz.

In examples where the frequency detector 160 determines $f_0$ by using a FFT method, the frequency resolution r in Hertz of the determined $f_0$ value depends on the duration T of the sampled signal in seconds according to the equation r=1/T, provided that the sampling rate is at least 2 times the resonant frequency. For instance, to calculate the frequency to within an accuracy of 1 Hz, a signal length of 1 s should be acquired. This rule is also generally true for other methods of determining $f_0$.

In some examples, the sampling duration T, can be reduced while still providing sufficient frequency accuracy and resolution using a suitable sub-sampling method, such as an interpolation method. In this case, the resolution of the FFT, that is to say the frequency distance between adjacent points in the FFT spectrum, may be greater than the required frequency resolution. Using an interpolation or a fitting algorithm, the peak frequency can still be determined with a sub-sampling resolution.

Figure 7:
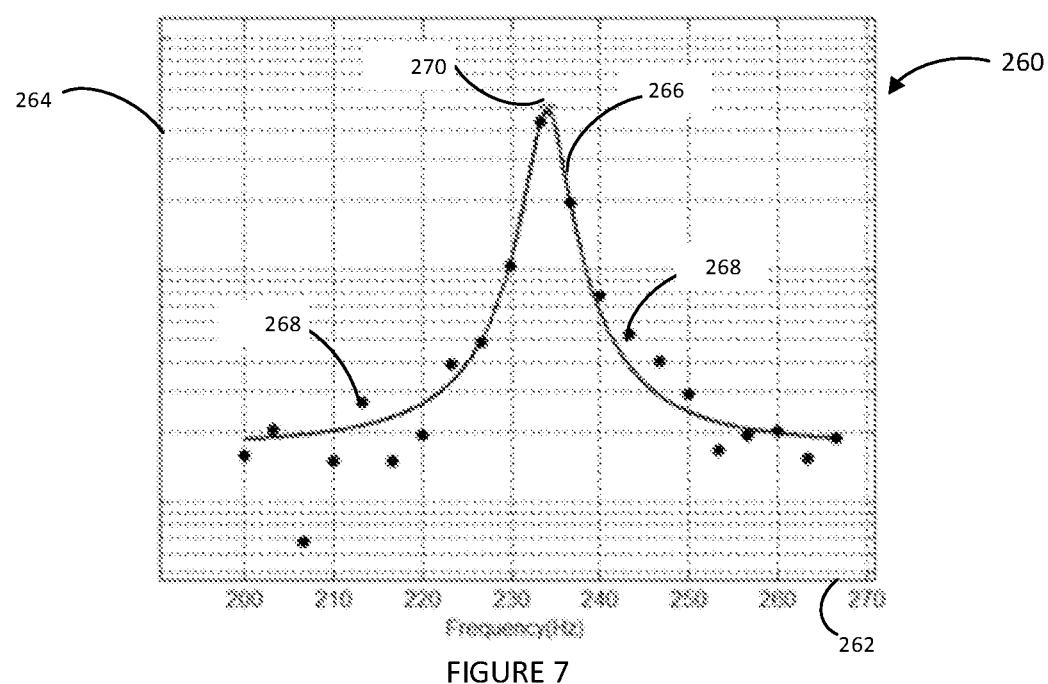
FIG. 7 shows an example of sub-sampling and interpolation of the example signal of FIG. 6A.

FIG. 7 shows a frequency spectrum 260 of a sub-sampled version of the signal shown in FIG. 6A. In this case the time signal of the LRA shown in FIG. 6A is sampled for a duration T of 300 ms. The x-axis 262 shows the frequency between 0 and 270 Hz plotted on a linear scale. The y-axis 264 shows the magnitude in arbitrary units. The sampled values 268 are shown in the frequency domain after the FFT has been applied to the signal illustrated in FIG. 6A. The resolution of the FFT spectrum in this example is 1/T=3.33 Hz. To obtain a value of the peak frequency with a resolution of less than 1 Hz, the frequency detector may determine for example a Lorentzian fit of a number of FFT points around the peak 270, which results in the fit curve 266. By calculating the frequency of the peak of the fit, $f_0$ can be determined with a resolution better than 1 Hz. In this case the peak position 270 is determined as $f_0$=234.1 Hz. By sub-sampling in this way, the frequency detector 160 may determine a resonant frequency with the required accuracy at reduced sample time. This may reduce the power consumption and memory capacity required by the frequency detector 160 to determine the resonant frequency.

Figure 8:
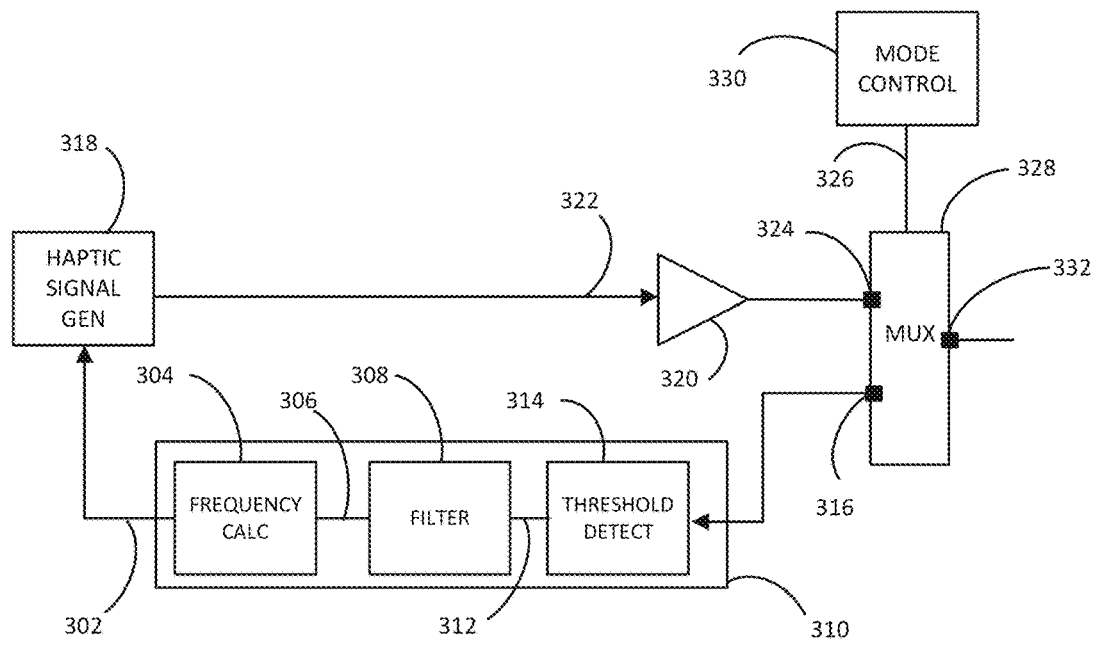
FIG. 8 illustrates a haptic actuator controller according to an embodiment.

FIG. 8 shows a haptic actuator controller 300. The haptic actuator controller 300 includes a frequency detector 310, a haptic driver 320, a haptic signal generator 318, a mode controller 330, and a multiplexer 328. The frequency detector 310 includes a frequency calculator 304, a filter 308 and a threshold detector 314. The haptic signal generator 318 may have an output connected to a haptic driver input 322. The haptic driver output may be connected to a first multiplexer terminal 324. A second multiplexer terminal 316 may be connected to the input of the threshold detector 314. A multiplexer control input 326 may be connected an output of the mode controller 330. A threshold detector output 312 may be connected to an input of the filter 308. A filter output 306 may be connected to an input of the frequency calculator 304. A frequency calculator output 302 may be connected to an input of the haptic signal generator 318.

In operation, a multiplexer third terminal 332 of the haptic actuator controller 300 may be connected to a haptic actuator (not shown) such as a LRA or piezo-electric actuator. In a first or drive mode of operation, the mode controller 330 may control the multiplexer 328 to couple the multiplexer first terminal 324 to the multiplexer third terminal 332. In this first mode, the haptic driver 320 may receive a drive signal on the haptic driver input 322 and drive the LRA.

In a second or listening mode of operation, the mode controller 330 may control the multiplexer 328 to couple the multiplexer second terminal 316 to the multiplexer third terminal 332. In this second mode, if an externally applied force causes the LRA to vibrate, a resulting signal received on the third terminal 332 may be detected by the frequency detector 310. The threshold detector 314 may compare the received signal generated by the LRA with a predetermined threshold value and only output the signal to the filter 308 if the signal is greater than a threshold value. The filter 308 may apply one or more of a high-pass, low-pass or band-pass filter to the signal to improve the signal to noise ratio. The frequency calculator 304 may determine a fundamental frequency of the received signal. For example, the fundamental frequency may be determined by zero-crossing counting, applying a fast fourier transform (FFT) to determine the peak frequency, or a wavelet transform.

The fundamental frequency determined by the frequency calculator 304 corresponds to the resonant frequency of the haptic actuator. The resonant frequency value determined by the frequency calculator 304 may be output on the frequency calculator output 302 and received by the haptic signal generator. The determined resonant frequency may be used by the haptic signal generator 318 to modify the haptic drive signal when the haptic actuator controller 300 returns to the first mode of operation. The haptic actuator controller 300 may determine an accurate value of resonant frequency in a passive or listening mode without a dedicated calibration signal. By determining the value in a passive mode, the accurate resonant frequency may be used to generate the haptic signal as soon as the drive mode is enabled.

Figure 9:
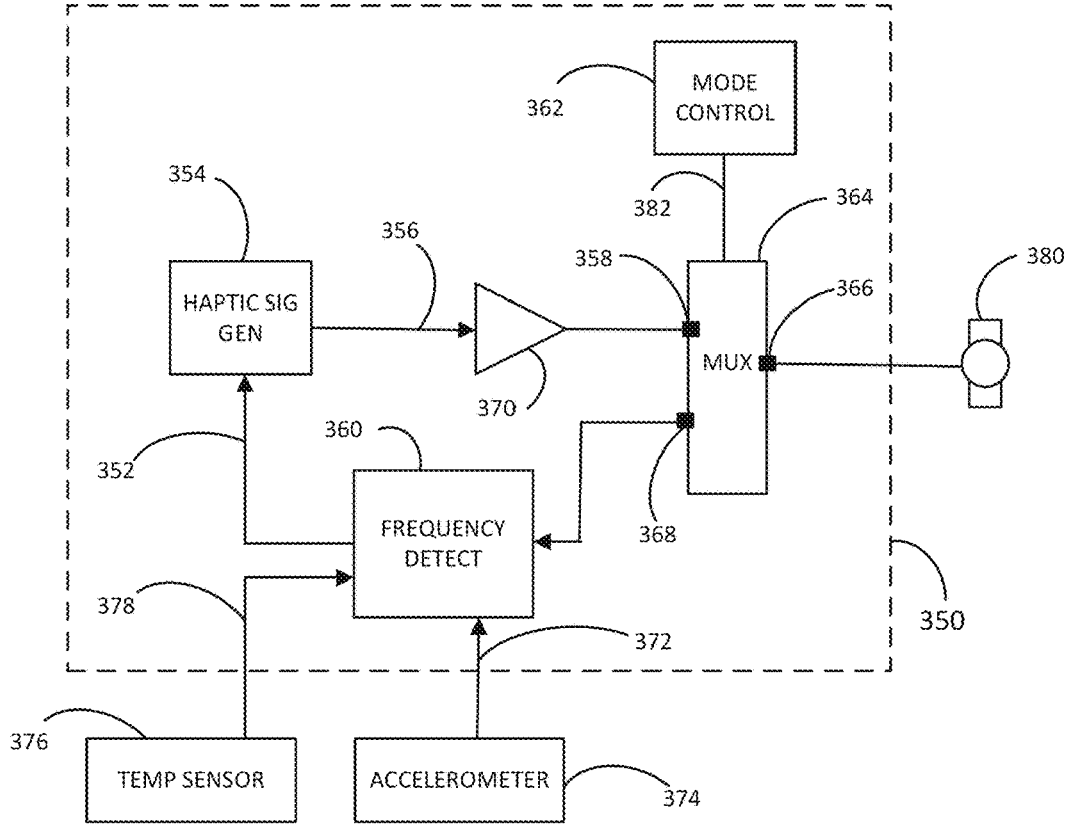
FIG. 9 shows a haptic actuator controller according to an embodiment.

FIG. 9 shows a haptic actuator controller 350. The haptic actuator controller 350 includes a frequency detector 360, a haptic driver 370, a haptic signal generator 354, a mode controller 362, and a multiplexer 364. The multiplexer 364 may be considered to implement a switch module. The haptic signal generator 354 may have an output connected to a haptic driver input 356. The haptic driver output may be connected to a first multiplexer terminal 358. A second multiplexer terminal 368 may be connected to the input of the frequency detector 360. A multiplexer control input 382 may be connected to an output of the mode controller 362. The frequency detector 360 may have a temperature sensor input 378. The frequency detector 360 may have an accelerometer input 372. A frequency detector output 352 may be connected to an input of the haptic signal generator 354.

The haptic actuator controller 350 may be included in a mobile device further including an LRA 380, a temperature sensor 376, and an accelerometer 374. The multiplexer third terminal 366 of the haptic actuator controller 350 may be connected to an LRA 380. The temperature sensor input 378 may be connected to the temperature sensor 376. The accelerometer input 372 may be connected to an accelerometer 374.

In a first or drive mode of operation, the mode controller 362 may control the multiplexer 364 to couple the multiplexer first terminal 358 to the multiplexer third terminal 366. In this first mode, the haptic driver 370 may receive a drive signal on the haptic driver input 356 and drive the LRA 380.

In a second or listening mode of operation, the mode controller 362 may control the multiplexer 364 to couple the multiplexer second terminal 368 to the multiplexer third terminal 366. In this second mode, if an externally applied force causes the LRA 380 to vibrate, a resulting signal received on the third terminal 366 may be detected by the frequency detector 360. The frequency detector 360 may determine a fundamental frequency of the received signal. For example, the fundamental frequency may be determined by the frequency detector 360 by zero-crossing counting, applying a fast fourier transform (FFT) to determine the peak frequency, or a wavelet transform.

The fundamental frequency determined by the frequency detector 360 may correspond to the resonant frequency of the LRA 380. The resonant frequency value determined by the frequency calculator may be output on the frequency calculator output and received by the haptic signal generator. The determined resonant frequency may be used by the haptic signal generator 354 to modify the haptic drive signal when the haptic actuator controller 350 returns to the first mode of operation. The haptic actuator controller 350 may determine an accurate value of resonant frequency in a passive or listening mode without a dedicated calibration signal.

The signal provided by the accelerometer 374 may be sampled by the frequency detector and subtracted from received signal. In some situations, an external vibration close to the resonant frequency may affect the accuracy of the resonant frequency determination. By subtracting the vibration signal detected by the accelerometer from the signal received from the LRA 370, the accuracy of the resonant frequency determination may be improved.

In other examples, the accelerometer signal may be used to enable the frequency detection on-demand so that the frequency detection is only enabled when a movement of a device including the haptic actuator controller 350 occurs. The frequency detector 360 may be enabled on-demand in response to a change of temperature indicated by the temperature signal received from the temperature sensor 376. In other examples, the temperature sensor 376 or the accelerometer 374 may be omitted.

Examples of the haptic actuator controller may be implemented using hardware, or a combination of hardware and software.

Figure 10:
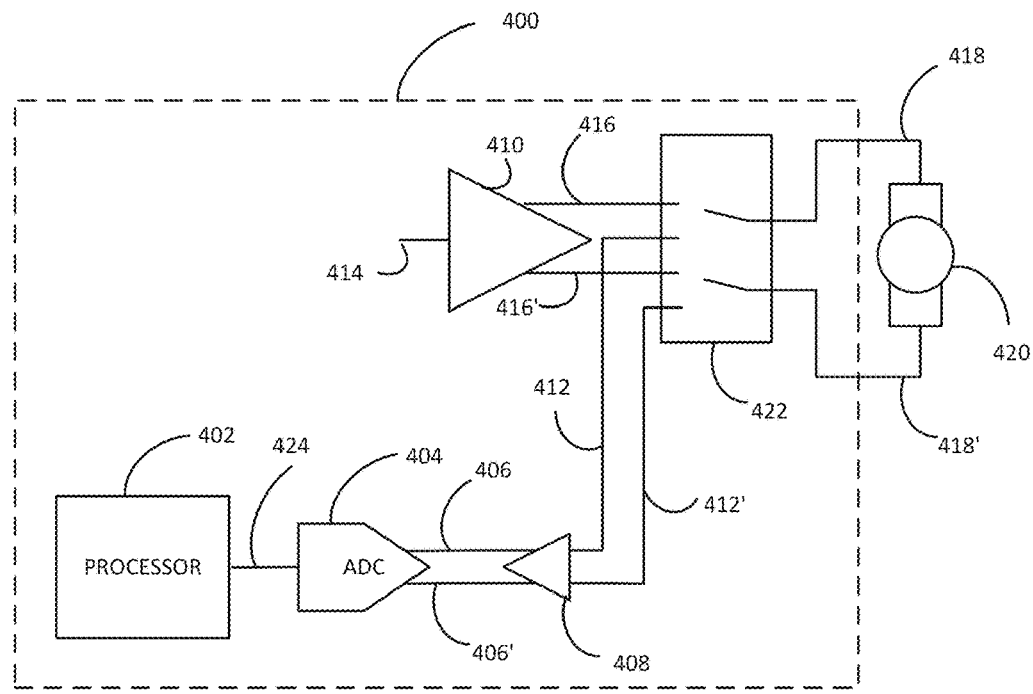
FIG. 10 illustrates a haptic actuator controller according to an embodiment.

A further example haptic actuator controller 400 connected to an LRA 420 is shown in FIG. 10. Haptic actuator controller 400 includes a processor 402, an analog-to-digital converter 404, a pre-amplifier 408, a switch module 422 and a haptic driver 410 which is a power amplifier, for example a class-D amplifier. The haptic driver 410 has a haptic driver input 414 for receiving a haptic signal. The haptic driver 410 has differential outputs 416, 416' connected to the switch module 422. The pre-amplifier 408 has differential inputs 412, 412' connected to the switch module 422. The LRA 420 has terminals 418' 418' connected to the switch module 422. The pre-amplifier 408 has differential outputs 406, 406' connected to the analog-to-digital converter 404. In other examples, the pre-amplifier may have a single output. The output 424 of the analog-to-digital converter 404 is connected to the processor 402, which may for example be a digital signal processor or other microprocessor.

In a first or drive mode of operation the switch module may be configured by a control module (not shown) to connect the LRA terminals 418, 418' to the driver outputs 416, 416'. In a second or listening mode of operation, when the LRA 420 is not in use, the switch module 422 may be configured to connect the LRA terminals 418, 418' to the pre-amplifier inputs 412, 412'. In this position, any signal generated by the LRA 420 may be fed into the analog pre-amplifier 408, then converted into a digital signal by the analog-to-digital converter 404. The digital signal may then be received by the processor 402. In some examples, the preamplifier 408 may be omitted if the analog-to-digital converter 404 is sensitive enough to resolve the small emf of the generated signal.

In the second mode of operation, software running on the processor 402 may implement a frequency detector to determine the fundamental frequency of the generated signal. For instance, the Fast Fourier Transform (FFT) algorithm, zero-crossing counting, wavelet transform may be implemented. The processor 402 may also include a digital filter or a cascade of digital filters to increase the signal-to-noise ratio. The filter may be low-pass, high-pass, or band-pass, depending on the noise spectrum.

Figure 11:
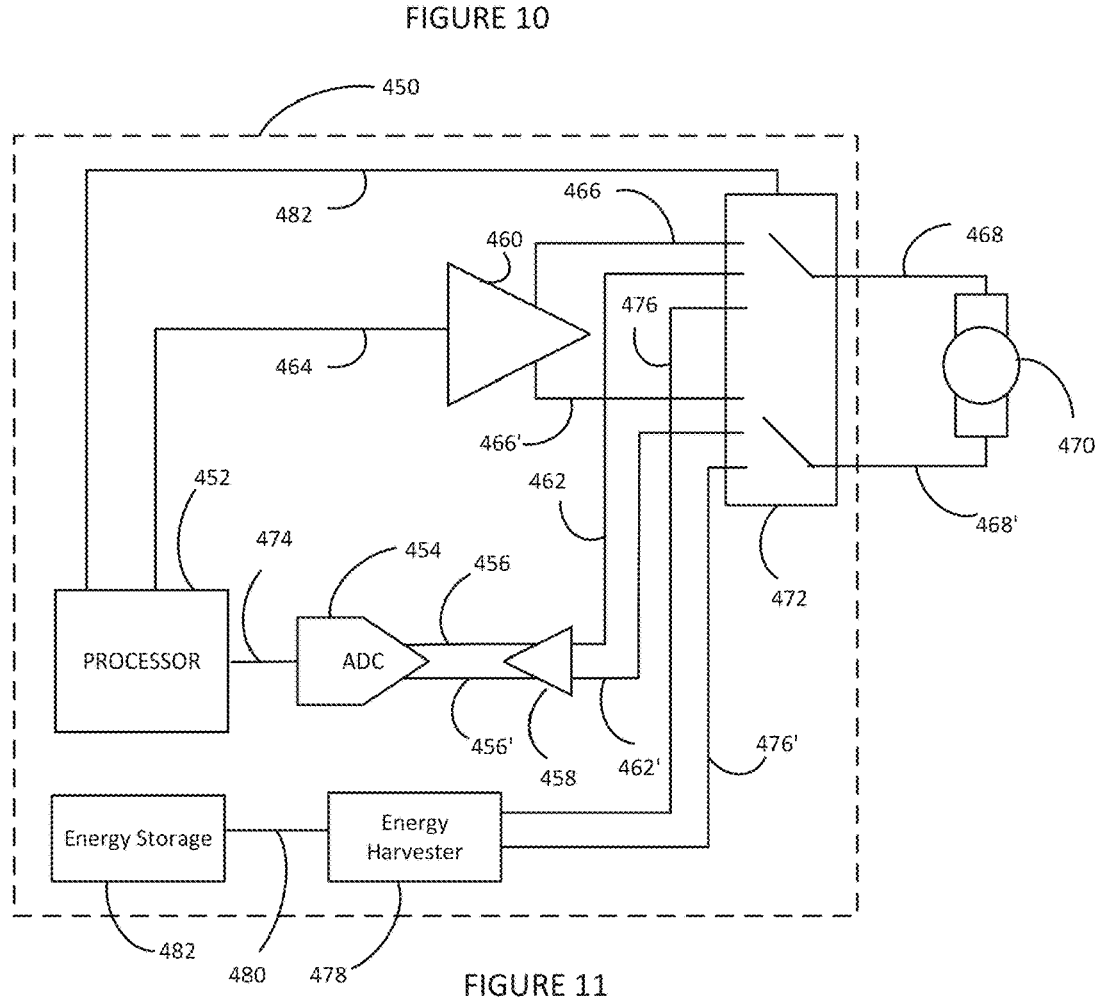
FIG. 11 illustrates a haptic actuator controller with energy harvesting according to an embodiment.

A mobile device including a haptic actuator controller 450 having an energy harvester 478 and connected to an LRA 470 is shown in FIG. 11. Haptic actuator controller 450 includes a processor 452, an analog-to-digital converter 454, a pre-amplifier 458, a switch module 472, an energy harvester 478, an energy storage module 482, and a haptic driver 460 which is a power amplifier, for example a class-D amplifier. The haptic driver 460 has a haptic driver input 464 for receiving a haptic signal. The haptic driver 460 has differential outputs 466, 466' connected to the switch module 472. The pre-amplifier 458 has differential inputs 462, 462' connected to the switch module 422. The LRA 470 has terminals 468' 468' connected to the switch module 472. The pre-amplifier 458 has differential outputs 456, 456' connected to the analog-to-digital converter 454. The output 474 of the analog-to-digital converter 454 is connected to the processor 452, which may for example be a digital signal processor or other microprocessor. The processor 452 may have a control output 482 connected to the switch module 472. The energy harvester 478 has differential inputs 476, 476' connected to the switch module 472. The energy harvester has an output 480 connected to the energy storage module 482.

In a first or drive mode of operation the processor 452 may control the switch module 472 to connect the LRA terminals 468, 468' to the driver outputs 466, 466'.

In a second or listening mode of operation, when the LRA 420 is not in use, the processor 452 may control the switch module 472 to connect the LRA terminals 468, 468' to the pre-amplifier inputs 462, 462'. In this mode, any signal generated by the LRA 470 may be fed into the analog pre-amplifier 458, then converted into a digital signal by the analog-to-digital converter 454. The digital signal may then be received by the processor 452. In some examples, the pre-amplifier 458 may be omitted if the analog-to-digital converter 454 is sensitive enough to resolve the signal.

In the second mode of operation, software running on the processor 452 may implement a frequency detector to determine the fundamental frequency of the generated signal. For instance, the Fast Fourier Transform (FFT) algorithm, zero-crossing counting, wavelet transform may be implemented. The processor 452 may also include a digital filter or a cascade of digital filters to increase the signal-to-noise ratio. The filter may be low-pass, high-pass, or band-pass, depending on the noise spectrum.

In a third mode of operation, when the LRA 420 is not in use, the processor 452 may control the switch module 472 to connect the LRA terminals 468, 468' to the energy harvester inputs 476, 476'. In this third mode, any signal generated by the LRA 470 may be fed into the energy harvester 478 which may convert the signal to DC and accumulate the signal over time. The harvested energy may be stored by the energy storage module 482. The stored energy may be used by the haptic actuator controller 450 or other components in a system including the haptic actuator controller 450. In other examples, the second and third modes may be combined and the resonant frequency determined in addition to the energy of the generated signal being stored.

Figure 12:
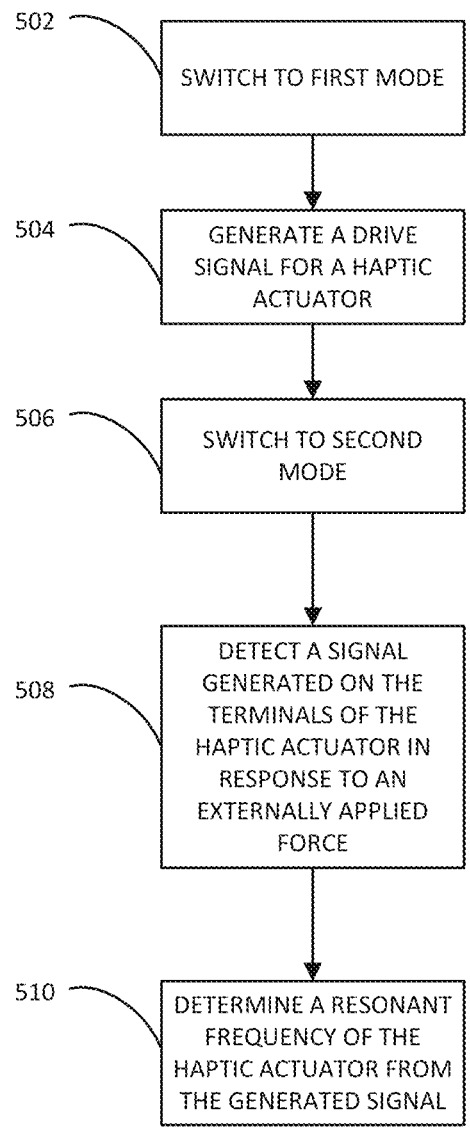
FIG. 12 shows a method for haptic actuator control according to an embodiment.

FIG. 12 shows a method of operating a haptic actuator controller 500. In step 502, the haptic actuator controller may switch to a first mode. In step 504, a drive signal for a haptic actuator may be generated. In step 506 when the haptic actuator is not in use, the haptic actuator controller may switch to a second mode of operation. In step 508, a signal generated on the terminals of the haptic actuator in response to an externally applied force may be detected. In step 510, a resonant frequency of the haptic actuator may be determined from the generated signal.

Embodiments of the haptic actuator controller described herein allow passive determination of the resonant frequency from a signal generated by the haptic actuator due to environmental vibration. The haptic actuator may be for example an LRA or a piezo electric actuator. The detection of the haptic actuator resonant frequency can occur in between the haptic operations, so that the frequency value is available prior to generating a haptic pattern. The haptic actuator controller may determine resonant frequency with reduce power consumption.

Embodiments of the haptic actuator controller may be included in devices which have haptic actuators such as smartphones, tablets, laptops and other handheld devices.

A controller for a haptic actuator is described. The controller includes a driver which has an output configured to be coupled to a haptic actuator in a first mode and a frequency detector having an input configured to be coupled to the haptic actuator in a second mode. The frequency detector is configured to detect a signal generated on the terminals of the haptic actuator in response to an externally applied force and to determine a resonant frequency of the haptic actuator from the generated signal.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A controller for a haptic actuator comprising:
a driver having an output configured to be coupled to a haptic actuator, in a first mode; and
a frequency detector having an input configured to be coupled to the haptic actuator in a second mode; wherein in the second mode, the frequency detector is configured to detect a signal generated on the terminals of the haptic actuator in response to an externally applied force and to determine a resonant frequency of the haptic actuator from the generated signal, and the haptic actuator is not driven by the driver in the second mode, the resonant frequency determined in the second mode is used to modify the frequency of the drive signal provided by the driver to the haptic actuator in the first mode.

2. The controller of claim 1 wherein the frequency detector comprises a threshold detector wherein the frequency detector is configured to determine the resonant frequency in response to the generated signal exceeding a predetermined threshold.

3. The controller of claim 1 wherein the frequency detector comprises a further input configured to be coupled to an accelerometer.

4. The controller of claim 3 wherein the controller is configured to switch to the second mode in response to an accelerometer signal being received on the further input.

5. The controller of claim 3 wherein the controller is configured to detect an accelerometer signal and to determine the resonant frequency from the generated signal in response to receiving the accelerometer signal.

6. The controller of claim 1 wherein the controller is further configured to detect a temperature signal and to determine the resonant frequency from the generated signal in response to detecting a change of temperature.

7. The controller of claim 1 wherein the frequency detector is configured to determine the resonant frequency by at least one of detecting the zero-crossings of the generated signal, cross-correlating the generated signal with sine waves of varying frequency, and by applying the Goertzal algorithm to the generated signal.

8. The controller of claim 1 wherein the frequency detector is configured to determine the resonant frequency by determining the frequency spectrum of the generated signal and determining the frequency with the highest amplitude.

9. The controller of claim 8 wherein the frequency detector is further configured to determine the resonant frequency by interpolation of the determined frequency spectrum.

10. The controller of claim 1 comprising a mode controller and a switch module, the switch module having a first switch terminal coupled to the driver output, a second switch terminal coupled to the frequency detector input, a third switch terminal configured to be coupled to a haptic actuator, and a control terminal coupled to the mode controller, wherein the mode controller is configured to control the switch module to couple the first switch terminal to the third switch terminal in the first mode and the second switch terminal to the third switch terminal in the second mode.

11. The controller of claim 10 further comprising a series arrangement of an energy harvester module and an energy storage module coupled to the frequency detector, wherein the switch module further comprises a fourth switch terminal and the mode controller is configured to control the switch module to couple the third switch terminal to the fourth switch terminal in a third mode, wherein in the third mode the controller is configured to store the energy from the generated signal and wherein in the second mode the stored energy is supplied to the frequency detector.

12. A device comprising the controller of claim 1 coupled to a haptic actuator.

13. A method for controlling a haptic actuator comprising:
in a first mode providing a drive signal for a haptic actuator by a driver; and
in a second mode detecting a signal generated on the terminals of the haptic actuator in response to an externally applied force and determining a resonant frequency of the haptic actuator from the generated signal by a frequency detector, wherein the haptic actuator is not driven by the driver in the second mode, the resonant frequency determined in the second mode is used to modify the frequency of the drive signal provided by the driver to the haptic actuator in the first mode.

14. The method of claim 13 further comprising determining the resonant frequency by determining the frequency spectrum of the generated signal and determining the frequency with the highest amplitude by interpolation of the determined frequency spectrum.

* * * * *